United States Patent
Gordon et al.

(10) Patent No.: US 11,722,501 B2
(45) Date of Patent: *Aug. 8, 2023

(54) DEVICE MANAGEMENT IN POWER SYSTEMS USING MEDIA ACCESS CONTROL SECURITY (MACSEC)

(71) Applicant: Schweitzer Engineering Laboratories, Inc., Pullman, WA (US)

(72) Inventors: Colin Gordon, Katy, TX (US); Duane C. Skelton, Bellingham, WA (US)

(73) Assignee: Schweitzer Engineering Laboratories. Inc., Pullman, WA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/204,267

(22) Filed: Mar. 17, 2021

(65) Prior Publication Data

US 2022/0303253 A1    Sep. 22, 2022

(51) Int. Cl.
*H04L 9/40*    (2022.01)

(52) U.S. Cl.
CPC ...... *H04L 63/1416* (2013.01); *H04L 63/0281* (2013.01); *H04L 63/0435* (2013.01); *H04L 63/0485* (2013.01); *H04L 63/062* (2013.01); *H04L 63/1408* (2013.01)

(58) Field of Classification Search
CPC . H04L 63/0435; H04L 63/061; H04L 63/062; H04L 63/1408; H04L 63/1416; H04L 63/1425; H04L 2463/061
See application file for complete search history.

(56) References Cited

U.S. PATENT DOCUMENTS

| | | | |
|---|---|---|---|
| 7,729,276 B2 | 6/2010 | Akyol | |
| 8,386,772 B2* | 2/2013 | Guan | H04L 63/162 380/279 |
| 2003/0074584 A1* | 4/2003 | Ellis | H04L 63/0428 726/22 |
| 2007/0204137 A1* | 8/2007 | Tran | G06F 9/3861 712/E9.035 |
| 2009/0070447 A1* | 3/2009 | Jubinville | H04L 67/025 709/226 |
| 2009/0254655 A1* | 10/2009 | Kidwell | H04L 41/06 709/224 |
| 2010/0020724 A1* | 1/2010 | Wimmer | H02H 1/0061 370/254 |
| 2011/0109636 A1* | 5/2011 | Chan | G06F 3/14 345/543 |

(Continued)

OTHER PUBLICATIONS

"IEEE Standard for Local and Metropolitan Area Networks—Port-based Network Access Control IEEE STd 802.1X-2020" [Online], www.ieee.org, Feb. 20, 2020, [Retreived on Sep. 5, 2022], Retrieved from: < https://ieeexplore.ieee.org/stamp/stamp.jsp?tp=&arnumber=9018454 > (Year: 2020).*

*Primary Examiner* — Eric W Shepperd
(74) *Attorney, Agent, or Firm* — Bradley W. Schield; Richard M. Edge

(57) ABSTRACT

An intelligent electronic device (IED) includes memory and a processor operatively coupled to the memory. The processor is configured to establish, over a communication network of a power system, a connection association (CA) with a receiving device using a MACsec Key Agreement (MKA). The processor is configured to automatically send device management information via the MKA process.

15 Claims, 7 Drawing Sheets

(56) References Cited

U.S. PATENT DOCUMENTS

| | | | |
|---|---|---|---|
| 2011/0296044 A1* | 12/2011 | Weis | H04L 43/0811 |
| | | | 709/230 |
| 2012/0331082 A1* | 12/2012 | Smith | H04L 49/602 |
| | | | 709/208 |
| 2014/0109182 A1* | 4/2014 | Smith | H04L 63/1416 |
| | | | 726/3 |
| 2014/0280672 A1* | 9/2014 | Day | H04L 67/568 |
| | | | 709/213 |
| 2016/0036813 A1* | 2/2016 | Wakumoto | H04L 63/0272 |
| | | | 713/171 |
| 2018/0375842 A1* | 12/2018 | Aschauer | H04L 63/0272 |
| 2019/0116183 A1 | 4/2019 | Hussain | |
| 2019/0173860 A1 | 6/2019 | Sankaran | |
| 2019/0190910 A1* | 6/2019 | Min | H04L 63/062 |
| 2019/0191307 A1* | 6/2019 | Sheng | H04L 63/065 |
| 2019/0281031 A1* | 9/2019 | Pothula | H04L 69/324 |
| 2019/0342101 A1 | 11/2019 | Hayes | |
| 2020/0106719 A1 | 4/2020 | Acharya | |
| 2020/0195616 A1* | 6/2020 | Edgar | H04L 63/08 |
| 2020/0358764 A1* | 11/2020 | Hojilla Uy | H04L 9/0866 |
| 2021/0067329 A1* | 3/2021 | Coyle | H04L 9/0891 |
| 2021/0297416 A1* | 9/2021 | Gavraskar | H04L 67/142 |

\* cited by examiner

DEVICE MANAGEMENT IN POWER SYSTEMS USING MEDIA ACCESS CONTROL SECURITY (MACSEC)

TECHNICAL FIELD

The present disclosure relates generally to Media Access Control Security (MACsec), and more particularly, to facilitating communication between electronic devices in a power system.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
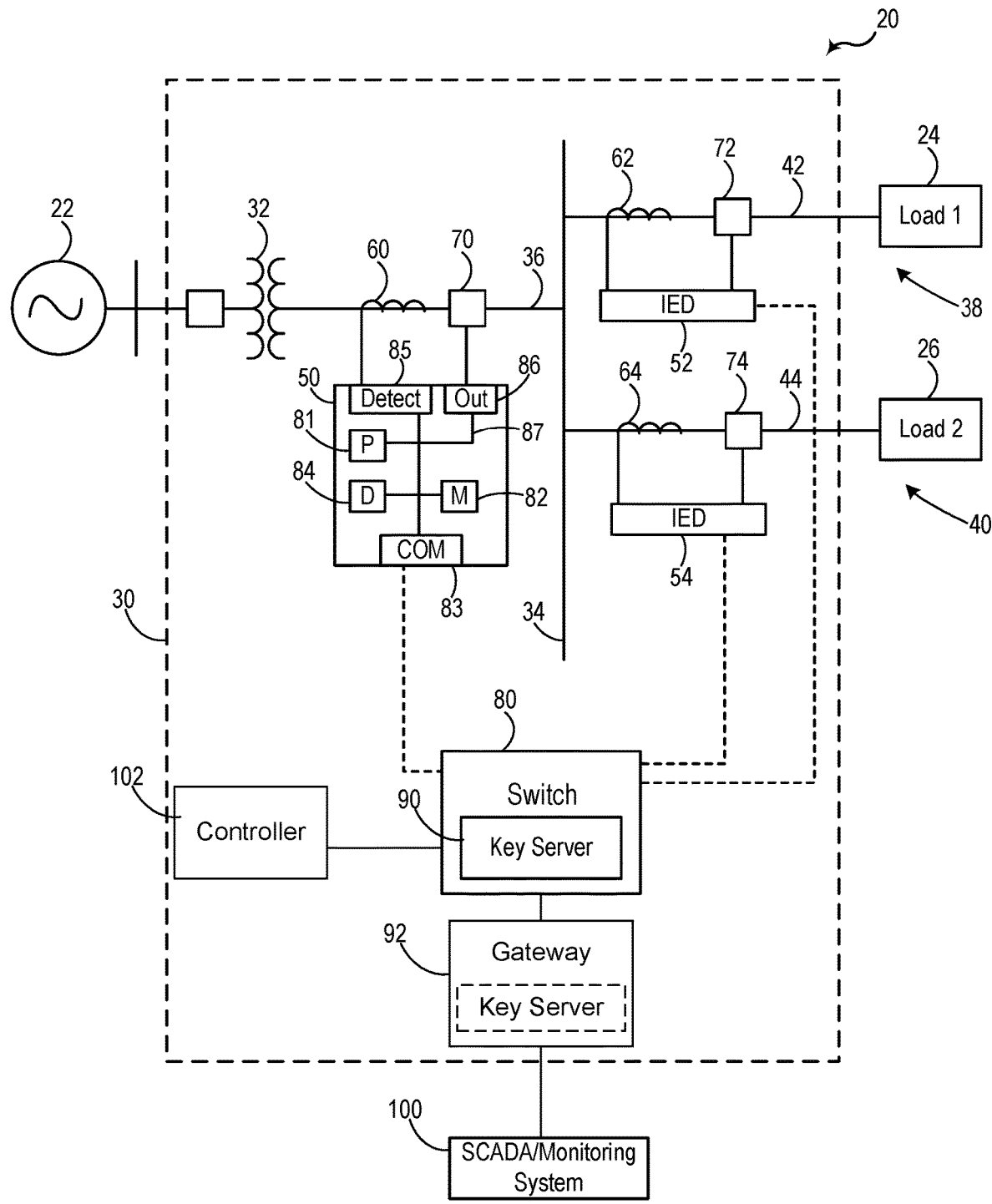
FIG. 1 is a one-line diagram of an electric power delivery system having intelligent electronic devices (IEDs) that communicate over a communication network, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring, control, and protection of the power delivery system. For example, IEDs may obtain voltage measurements and/or current measurements and trip circuit breakers to disconnect electrical equipment to protect the electric power delivery system from exceeding designed operating conditions due to faults.

IEDs may communicate with each other and other electronic devices to facilitate the monitoring, control, and protection of the power delivery system. For instance, IEDs may be connected to a wired Ethernet network, via a network switch, that receives data from a sending IED and forwards the received data to a destination IED. The IEDs may communicate power system data, such as voltage measurements, current measurements, circuit breaker statuses, and circuit breaker commands, among others, to allow the IEDs to better control and protect the power system.

To communicate, IEDs may send the power system data encapsulated into frames of a data link layer of a network. The data link layer may refer to the layer two of the open systems interconnection (OSI) architecture model. To improve security, IEDs may communicate the power system data according to the 802.1AE Institute of Electrical and Electronics Engineers (IEEE) Media Access Security (MACsec) frame format on the data link layer. Data communicated using MACsec frames may include an encrypted payload as well as additional header information. For example, the MACsec frame may include a Sectag that has an optional secure channel identifier (SCI). Within the SCI, a port identifier may be included.

To manage a network of IEDs, some actions may involve physically going to the IED and inspecting the operating state of the IED. IEDs may be located remote from one another or in difficult to reach places. Accordingly, there is a need in the field to allow operators to be aware of the operating state of IEDs without physically going to the device and still ensuring that access to the IED remains secure from unauthorized personnel.

As explained below, MACsec may be used to facilitate communication of device management information, such as network and device identification information. Further, IEDs may communicate device management information automatically (e.g., at predetermined intervals, upon request, or upon changes in state). By automatically communicating network and device identification information via MACsec key agreement (MKA) and MACsec, operators may manage network communication and device operating state without instrumenting the device by being physically present at the device, thereby reducing the difficulties in network and IED management.

FIG. 1 is a one-line diagram of a power system 20 that includes a power source 22, such as a distributed generator, that generates and provides power to loads 24 and 26, in accordance with an embodiment. The power system 20 may include equipment, such as electrical generators, transformers, power lines (e.g., transmission and distribution lines), circuit breakers, buses, loads, and the like. A variety of other types of equipment may be included in the power system 20, such as voltage regulators and capacitor banks, among others.

As illustrated, the power source 22 may provide power, via a substation 30, to power the loads 24 and 26. The substation 30 includes a transformer 32 that steps up or steps down the voltage to be provided to a bus 34 via power line 36. Various feeders 38 and 40 may be electrically connected to the bus 34 to provide power to the loads 24 and 26 via power lines 42 and 44. Although illustrated in single-line form for purposes of simplicity, power system 20 may be a multi-phase system, such as a three-phase electric power delivery system.

The power system 20 may be monitored by one or more IEDs 50, 52, and 54, although additional IEDs may also be utilized. As used herein, an IED (such as IEDs 50, 52, and 54) may refer to any microprocessor-based device that monitors, controls, automates, and/or protects monitored equipment within the power system 20. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. The IEDs 50, 52, and 54 may obtain electric power system data using current transformers (CTs) 60, 62, and 64, and potential transformers (PTs), and the like. The IEDs 50, 52, and 54 may detect events, such as fault events, on the power lines 36, 42, and 44 using current and voltage signals from the CTs 60, 62, and 64 and/or the PTs. The IEDs 50, 52, and 54 may be communicatively coupled to circuit breakers (CBs) 70, 72, and 74 to send control signals to the CBs 70, 72, and 74 to open (i.e., trip) or close the CBs 70, 72, and 74 based on the power system data.

The IED 50 may further include one or more processors 81, a computer-readable medium (e.g., memory 82), a communication interface 83, a display terminal 84, detection circuitry 85, and output circuitry communicatively coupled to each other via one or more communication buses 87. The processor 81 may be embodied as a microprocessor, a general-purpose integrated circuit, an application specific integrated circuit (ASIC), a field programmable gate array (FPGA), and/or other programmable logic devices. It should be noted that the processor 81 and other related items in FIG. 1 (e.g., the memory 82) may be generally referred to herein as "processing circuitry." Furthermore, the processing circuitry may be a single contained processing module or may be incorporated wholly or partially within any of the other elements within the IED 50. It should be noted that FIG. 1 is merely one example of a particular implementation and is intended to illustrate the types of components that may be present in the IED 50.

In the IED 50 of FIG. 1, the processor 81 may be operably coupled with the memory 82 to perform various algorithms. Such programs or instructions executed by the processor 81 may be stored in any suitable article of manufacture that includes one or more tangible, computer-readable media at least collectively storing the instructions or routines, such as the random-access memory (RAM) and the read-only memory (ROM).

In the illustrated embodiment, the IED 50 includes detection circuitry 85 that detects various electrical conditions of the power line 36 based on the input signals. The detection circuitry 85 may include a current conversion circuit (e.g., a transformer) that transform the input signals to levels that may be sampled by the IED 50. The detection circuitry 85 may include analog-to-digital converter(s) that sample the current and voltage signals and produce digital signals representative of measured current and measured voltage on the power line which may be transmitted to the processor 81. The IED 50 may compare the current measurements to thresholds to detect faults and to disconnect the bus 34 from the power source 22. For example, if current on one or more phases exceeds a preset threshold and/or current-over-time exceeds a preset threshold, the processor 81 may detect a fault event and send a signal, via the output circuitry 86, to open the CB 70.

In some embodiments, the IED 50 may include a communication interface 83, such as an ethernet port, to communicate with other IEDs. Further, the IED 50 may include a display terminal 84 and input structures (e.g., Universal-Serial-Bus (USB) ports, buttons, touchscreens, etc.) to allow operators to review events on the power line, change settings, etc.

Each of the IEDs 52 and 54 may have similar components (e.g., processor 81, memory 82, communication interface 83, display 84, detection circuitry 85, and output circuitry 86) to those described with respect to IED 50 to allow the IEDs 52 and 54 to obtain power system measurements, control the CBs 72 and 74, and to communicate. In some embodiments, the IEDs 50, 52, and 54 may communicate power system data via a communication network.

In the illustrated embodiment, the IEDs 50, 52, and 54 may be connected to a switch 80 to form a wired network. The switch 80 may receive frames of power system data from a sending IED and forward the power system data to a receiving IED For example, IED 50 may send and/or receive power system data to or from IEDs 52, and 54, such as voltage measurements, current measurements, and circuit breaker status, among others. If IED 52 were to detect a fault, IED 52 may communicate the fault event to IED 50 and the status of CB 72 via the wired network. If the CB 72 opens, the IED 50 may keep CB 70 closed to allow power to continue to be delivered to load 26. If IED 52 detects a fault and CB 72 remains closed, IED 50 may respond by opening CB 70, thereby isolating the fault. The IED 50 may respond to fault events faster due to the communication network, thus improving the reliability of the power system 20.

The switch 80 may include switching hardware and forwarding circuitry, which may include one or more processors, memory, and communication ports that allow the switch 80 to receive and forward power system data to a receiving device. The switch 80 may be embodied as a managed switch or an unmanaged switch.

The switch 80 may operate as a key server 90 that manages MACsec frame communication on the switch 80 via MACsec keys. In other embodiments, the key server 90 may be embodied as a gateway, a remote terminal unit (RTU), or the like. For example, a gateway may be an electronic device that operates as an access control that authorizes access or prevents unauthorized access onto the communication network from remote devices, such as a supervisory control and data acquisition (SCADA) system 100. The key server 90 may operate using hardware of the switch 80 or the gateway 92 or may include separate hardware to communicate MACsec keys. In certain embodiments, a controller 102, such as an SDN controller, may manage the communication network, based on inputs from a user, by sending control instructions to the switch 80. In some embodiments, the key server 90 may be a part of an intrusion detection system (IDS) that prevents intruders on the network by inspecting the messages.

Figure 2:
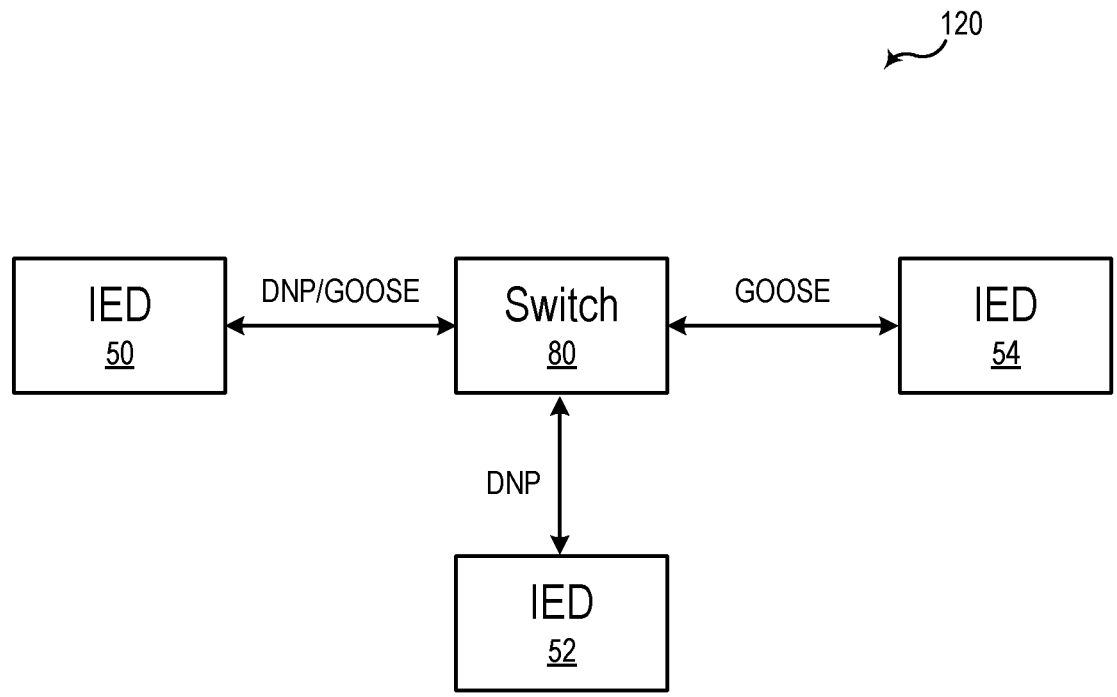
FIG. 2 is a network diagram of the communication network of FIG. 1, in accordance with an embodiment.

FIG. 2 is a block diagram of the communication network 120 of communication through the switch 80. Communication frames of different application protocols may be sent on the communication network 120, which may depend on the device and the configuration. For example, the IED 50 may communicate frames of a GOOSE application protocol with IED 52 and communicate frames of a DNP protocol with IED 54. Any suitable combination of application protocols may be used depending on the implementation of the power system 20. MACsec frames may be used to communicate power system data between each of the IEDs 50, 52, and 54 on the communication network 120.

Figure 3:
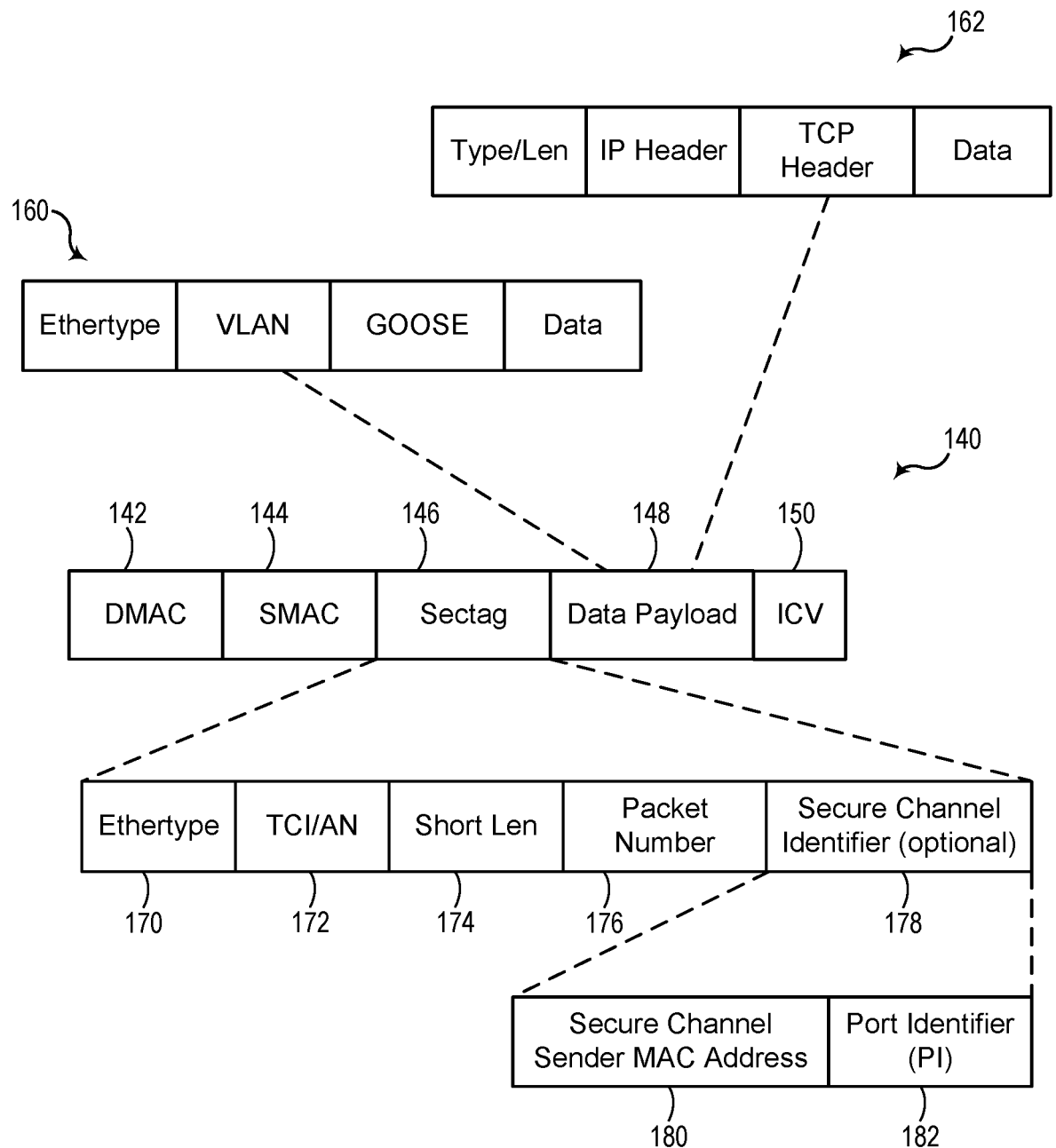
FIG. 3 is a layout of a Media Access Control Security (MACsec) frame that may be communicated on the communication network of FIG. 1, in accordance with an embodiment.

FIG. 3 is a field layout of an embodiment of a MACsec frame 140 that may be used in the communication network 120 of the power system 20. The MACsec frame 140 may include a destination media access control (MAC) address 142, a source MAC address 144, a security tag (Sectag) 146, an encrypted payload 148, and an integrity check value (ICV) 150. The MAC address may be a unique number of a network interface controller (NIC) of the device. The MAC address may be stored in firmware or ROM by the manufacture of the device. Some or all of the payload 148 may be encrypted depending on the application protocol of the MACsec frame. For example, MACsec frames communicating GOOSE messages 160 may include a first set of header fields and MACsec frames communicating DNP messages 162 may include a second set of header fields, different from the first set of header fields.

The Sectag 146 may include an Ethertype 170, a TAG Control Information/Association Number 172, a short len 174, and a packet number 176, which may be used to identify the decryption key and detect transmission of repeated frames. Further, in MACsec frames 140, the Sectag 146 may include a secure channel identifier 178, which is an optional field. The secure channel identifier 178 may include a secure channel sender MAC address 180 and a port identifier (PI) 182. The ICV 150 may ensure the integrity of the MACsec frame 140 by allowing the recipient to detect errors in the transmission process.

As mentioned above, one technique to ensure communication between devices operates as expected is by having an operator inspect the IED However, this process may be time consuming or difficult and may involve an operator being physically present at the IED and/or entering communication settings to enable the devices to communicate. As explained below, MACsec may be used to facilitate communication of device management information, such as automatic device identification, logging, alerting, password management, and device settings. In some embodiments, device management information may refer to device data that is separate from the power system data (e.g., voltages, currents, power, circuit breaker status, etc.) communicated to monitor, controls, and protect the power system.

Figure 4:
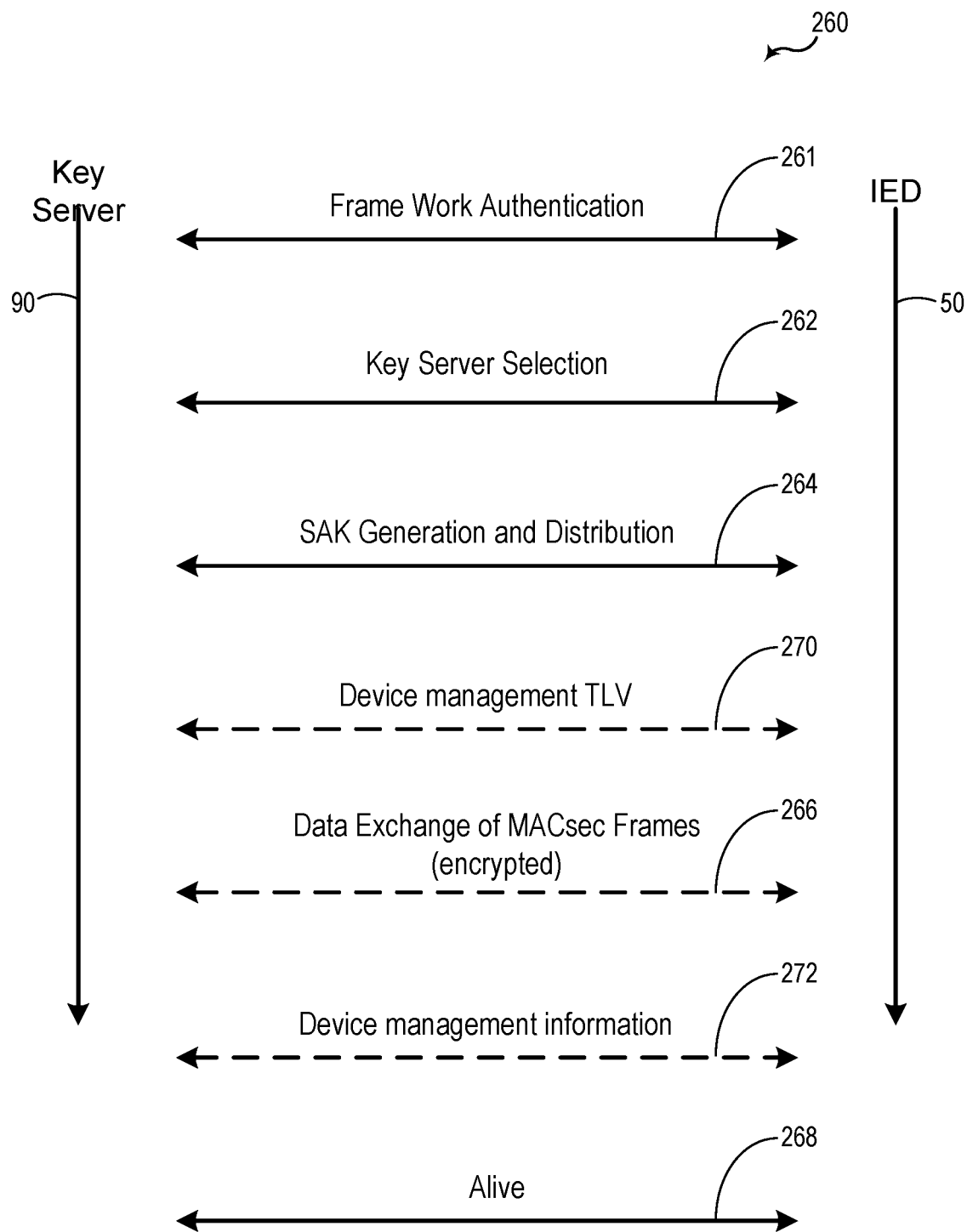
FIG. 4 is a timing diagram of an MACsec key agreement (MKA) process used to communicate MACsec frames between IEDs over the communication network of FIG. 1, in accordance with an embodiment.

FIG. 4 is a timing diagram of a process performed according to MACsec key agreement protocol (MKA) between a key server 90, such as the switch 80 or another IED, and an IED 50 to establish a connectivity association (CA) that connects peer-to-peer devices in the communication network 120. Before MKA begins, framework authentication (arrow 261) may occur in which each of the devices authenticate the other. For example, secure pre-shared key (PSK) authentication may be used in which each device uses shared keys to ensure that the devices are in fact allowed on the communication network 120. As another example, a master session key (MSK) may be obtained from an extensible authentication protocol (EAP) session. The MSK may then be used to determine a connectivity association key (CAK) for the MKA process.

Following the framework authentication, the MKA process may begin with the peer-to-peer devices selecting a key server. In the illustrated embodiment, the switch 80, the gateway 92, or another device may be selected as the key server 90 (arrow 262). The process may continue with the key server 90 generating secure association keys (SAKs), which may refer to a random value that is generated based on the CAK. The key server 90 may then communicate the SAK to any of the peer connected devices on the communication network 120 (e g, IEDs 50, 52, and 54), thereby establishing a CA between the key server 90 and the IED 50 (arrow 264).

The key server 90 and the IED 50 may then exchange power system data via MACsec frames (arrow 266). The key server 90 and the IED 50 may further continue to send keep alive signals indicating that the CA is still alive (arrow 268). The MKA may be repeated for each of the application protocols that are used to communicate between the key server 90 and the IED 50.

IEDs may be on-line for lengthy periods of times (e.g., months, years, decades, etc.) Further, changes in communication networks may occur, such as adding additional IEDs, removing IEDs, changing passwords, changing operating systems, changing firmware, and updates in logging/alerting systems. One technique to manage changes in the communication network is by having operators change settings at the IEDs. However, such changes may be difficult or time-consuming depending on the number of IEDs, the difficulty accessing the IEDs, etc.

The MKA protocol may also allow for MKA messages to send and receive communication network-management messages that are system-related (non-power system data that indicates how the communication network is expected to operate) and not limited to MACsec frames. For example, MKA messages may include MKA type-length-value (TLV) messages that specify the type of data in the message, the length of the message, and a value (e.g., payload) of the message. Further, MKA messages may contain a parameter set type that indicates the format of the message and a payload in the format associated with the parameter set type.

As explained below, MKA messages may be used to communicate network changes to IEDs and/or other network devices. For example, IEDs may be pre-configured to automatically communicate device information to other devices on the communication network. The automatic communication of device information may be periodically performed to ensure that other devices are able to monitor the communication network.

As mentioned above, the MKA protocol process 260 may be used on a device management CA, separate from the power system CA, to communicate device management information. Further, the IEDs 50 may automatically communicate device management information (arrow 270) upon establishing the communication link (e.g., device management CA). By automatically communicating the device management information, security of the communication network may be monitored without instrumenting the IED The IED 50 may continue to periodically communicate the device management information at preset intervals (arrow 272) to allow for detection of changes in the power system.

Figure 5:
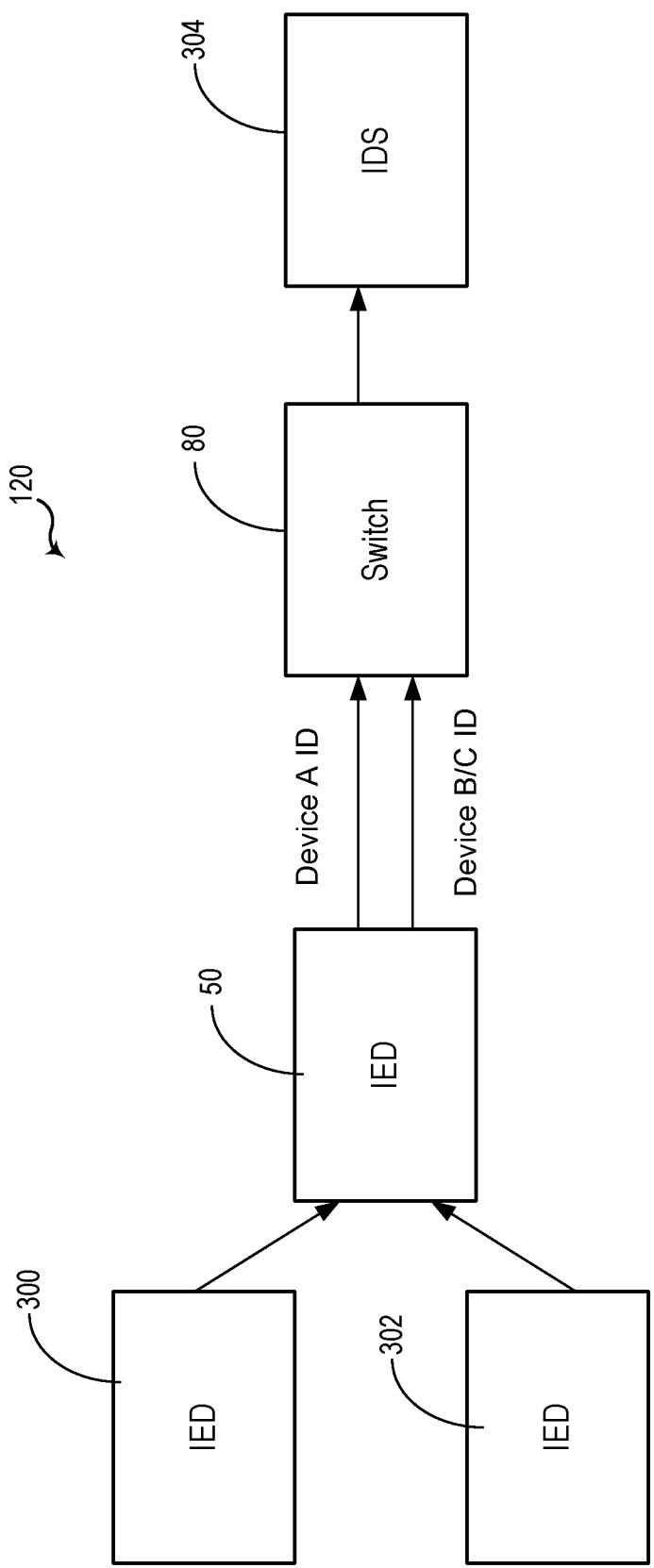
FIG. 5 is a block diagram of a communication network that is used communicate device management system information for the IEDs of FIG. 1, in accordance with an embodiment.

FIG. 5 is a block diagram of an embodiment of the communication network 120 in a power system IED 50 may be connected to a switch 80 to communicate with other IEDs and devices. Further, an intrusion detection system (IDS) 304 may be connected to the switch 80 to monitor the communication network for intruders. The IDS 304 may monitor communication on the communication network 120 by monitoring data being routed by the switch 80.

The IED 50 may obtain power system data via sensors or other IEDs. The IED may communicate the power system data via the communication network using the MKA protocol described above.

In addition to communicating power system data, the IED 50 may communicate device setting information (e.g., device identification information) on the same CA as the power system data. Alternatively, the IED 50 may form a separate device setting CA with other devices via the switch 80 and/or key server to allow the devices to communicate device information. For example, the IED 50 may establish a device CA with the IDS 304 and other IEDs. Upon establishing the device CA with the other devices, the IED 50 may communicate hardware model, serial numbers, current firmware, operating system, running memory, and settings hashes to the other IEDs and/or the IDS. Further, the IED 50 may periodically announce the device settings to the other CA devices at a preset interval (e.g., once per minute, once per hour, etc.).

The device information messages may be special MKA protocol type-length-value messages, different from power system MACsec messages that communicate MACsec frames, where the MKA message indicates the type of data, the length of the data, and the value. As an example, the MKA message may indicate that the message is communicating a hardware model as the type, the length of the hardware model, and the value of the hardware model of the IED 50.

In another embodiment, the MKA message may be a parameter set-type message that indicates a different message format that is expected to include particular fields. For example, the MKA message may have a parameter set-type indicating device settings and include hardware model, serial number, and firmware in a predetermined order according to the parameter set-type.

By periodically announcing device information to other devices and/or the IDS of the communication network, the IDS may monitor device connections, device settings, and device state. Further, by periodically announcing device identification information, the identification information may be captured by the IDS without querying the IED and without sharing keys by inputting keys at each of the devices while allowing the IDS to identify devices connected to the communication network. In some embodiments, the IDS may notify operators if a device management message is not received from an IED within an expected period of time. For example, if the IDS is expecting to receive a device management message from an IED that is not communicated, the IDS may send a notification to an operator to allow the operator to respond to the missing device management message.

As illustrated, IEDs 300 and 302 may use IED 50 as a proxy and send information to the IDS 304 through the IED 50. That is, IEDs 50, 300, and 302 may each periodically (e.g., each second, each minute, each hour, each day, each week, etc.) send their device identification information to the IDS 304 to allow the IDS 304 to monitor the devices in the communication network 120. In addition to intrusion detection, MACsec and MKA protocol may be used to automatically communicate data that allows for logging and alerting.

Figure 6:
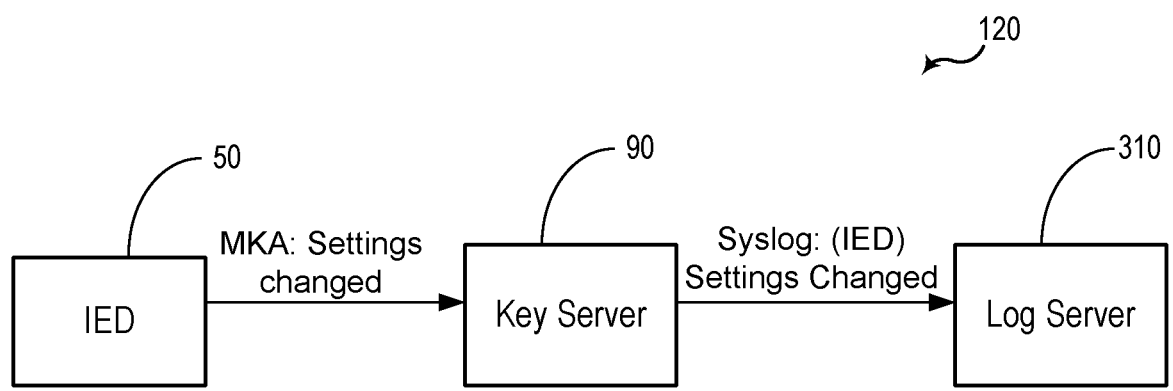
FIG. 6 is a block diagram of a communication network that is used communicate event information for the IEDs of FIG. 1, in accordance with an embodiment.

FIG. 6 is a block diagram of another method in which automatic communication via MKA protocol may be used to allow monitoring of the communication network 120. During the initial MKA adoption process (process 260 of FIG. 4) between the key server 90 and the IED 50, the IED 50 may announce to the key server 90 that the IED 50 has a MACsec logging and/or alerting capability. As explained above, the IED 50 may communicate an MKA TLV message or an MKA protocol message with a parameter set type that indicates that the message includes a MACsec logging/alerting setting. Upon adoption via the process 260, the IED 50 may automatically communicate stored logs and/or of, for example, event information (e.g., power system logging and/or alerting information) in an MKA TLV message or an MKA protocol message with a parameter set type that indicates the message includes logging/alerting information. Further, the IED 50 may continue to send the logs/alerts at periodic intervals and whenever a new sequence of events (SOE) is generated (e.g., upon occurrence of a new set of events).

As mentioned above, the device may communicate using a separate connectivity association for device messages, such as logging, alerting, device identification, etc. The alerting process may have the option to encrypt the device message with a CAK that can be shared with the IDS 304. The key server 90 may then forward the event information to the log server 310.

Figure 7:
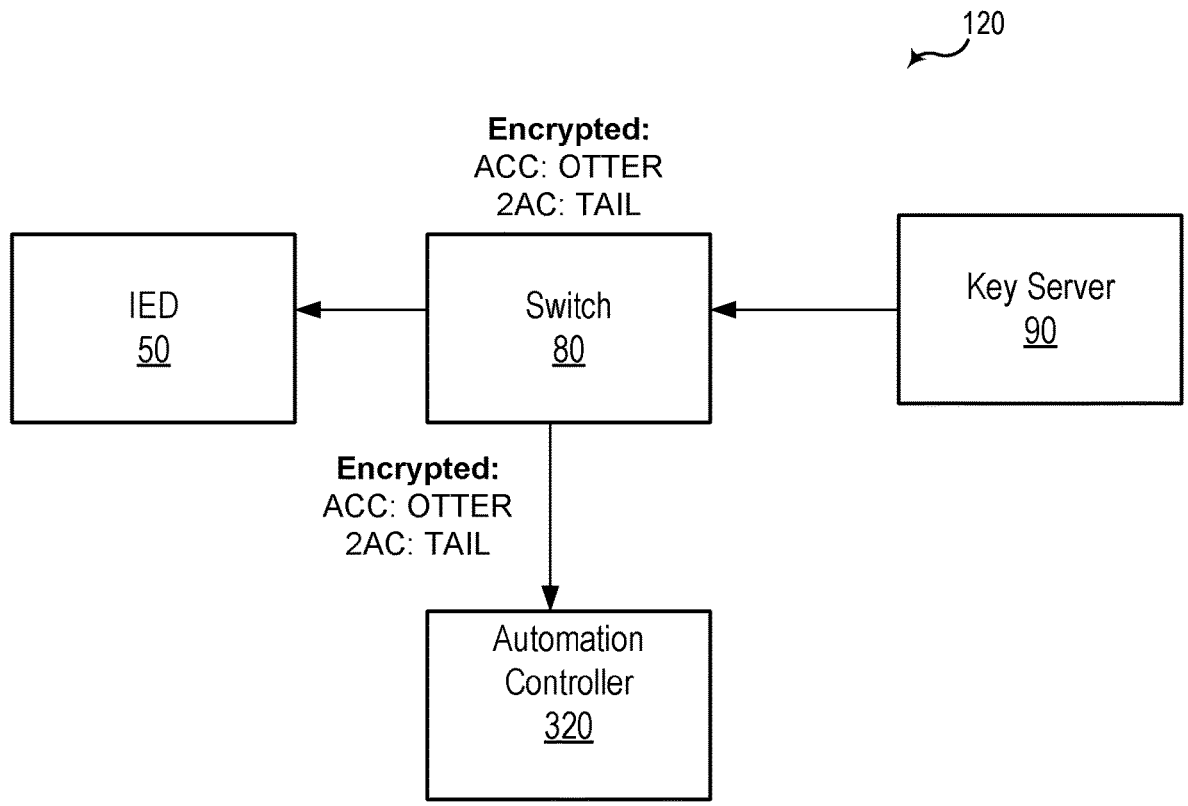
FIG. 7 is a block diagram of a communication network that is used communicate password information from a key server to the IEDs of FIG. 1, in accordance with an embodiment.

FIG. 7 is a block diagram illustrating another technique in which power system communication networks may use MACsec and MKA protocol for device management information communication. IEDs may use passwords for access control in obtaining monitoring data and performing control actions. Periodically, it may be desirable to update the passwords of the IED to ensure security of the IED and the communication network.

As illustrated, during initial MKA adoption negotiation as described in process 260, the IED 50 may announce to the key server that it has a MACsec password management capability that allows the key server 90 to update passwords on the IED 50 by sending updated passwords via MKA protocol. MACsec and MKA protocol may be used to change passwords on the IED over a secure LAN. For example, the key server 90 may send an MKA TLV message or a MKA message with a parameter set type indicating that the message includes an updated password to update each of the passwords on the IED 50. The password change may be encrypted using a key-encryption-key (KEK) derived from the CAK of the CA on the communication network. The CAK may be shared with an IDS system or an automation controller 320 that uses the IED password. The key server 90 may send the MKA message with the updated passwords to the switch 80, and the switch 80 may provide the MKA message with the passwords to the connected devices, such as IED 50 and the automation controller 320. The password communication may be sent on a separate password management CA, a device management CA, or the power system data CA. By communicating device management information using the MKA process, IDS and password management systems may allow operators to protect the communication system without having an operator physically be present at the IED. Further, automatically communicating the device management information upon MKA initialization and/or at periodic intervals may allow IDS systems to detect changes in the communication network, thereby improving the security of the communication network.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An intelligent electronic device (IED) of a power system, comprising:
    a memory, comprising device management information; and
    a processor operatively coupled to the memory, wherein the processor is configured to:
        establish, over a communication network of the power system, a communication link between the IED and a server according to media access control security (MACsec) key agreement (MKA) protocol;
        generate an MKA message comprising an MKA type-length-value (TLV) message;
            wherein the TLV message comprises a parameter set type that indicates that the MKA message includes the device management information;
        receive proxy device management information from another IED that is not connected directly to the communication network;
        send the MKA message via the MKA protocol over the communication network to allow monitoring of the device management information on the communication network; and
        provide the proxy device management information and the MKA message to an intrusion detection system (IDS) to allow the IDS to monitor the IED and the another IED that is not connected directly to the communication network.

2. The IED of claim 1, wherein the processor is configured to send the MKA message at a periodic interval to allow the IDS to detect changes in the communication network.

3. The IED of claim 1, wherein the device management information of the MKA message comprises firmware version information, operating system information, memory information, ports, services, IED security state, or any combination thereof.

4. The IED of claim 1, wherein the communication link comprises a device management connectivity association (CA), and wherein the processor is configured to send power system data over a power system CA, separate from the device management CA.

5. The IED of claim 1, wherein the device management information is encrypted with a secure association key (SAK) derived from a connectivity association key (CAK) from the MKA protocol.

6. The IED of claim 1, wherein the processor uses a first thread to communicate power system data and a second thread to communicate the device management information.

7. A method, comprising:
    receiving, by a server, device management information of an intelligent electronic device (IED) of an electric power system;
    establishing, by the server, a connectivity association (CA) via Media Access Control Security (MACsec) key agreement (MKA) protocol;
    generating, by the server, an MKA message comprising an MKA type-length-value (TLV) message, wherein the TLV message comprises a parameter set type that indicates that the MKA message includes the device management information;
    sending, by the server, the MKA message over a communication network;
    receiving, by the IED, proxy device management information from another IED that is not connected directly to the communication network; and
    sending, by the IED, the proxy device management information and the MKA message to an intrusion detection system (IDS) to allow the IDS to monitor devices connected to the IED.

8. The method of claim 7, wherein the device management information comprises password changes of the IED.

9. The method of claim 7, comprising:
    receiving, by an automation controller, a password change of the IED; and
    updating a database of IED passwords on the automation controller based on the password change.

10. The method of claim 7, wherein the server is a gateway device that operates as a MACsec key server on the communication network.

11. A non-transitory, computer-readable medium comprising instructions configured to be executed by a processor of an intelligent electronic device (IED) of a power system, wherein the instructions are configured to cause the processor to:
    establish, over a communication network of the power system, a communication link between the IED and a server according to media access control security (MACsec) key agreement (MKA) protocol;
    generate an MKA message comprising an MKA type-length-value (TLV) message wherein the TLV message comprises a parameter set type that indicates that the MKA message includes event information;
    receive proxy device management information from another IED that is not connected directly to the communication network; and
    send the MKA message and the proxy device management information via MKA protocol over the communication network to an intrusion detection system (IDS) to allow monitoring of the event information and the another IED.

12. The non-transitory, computer-readable medium of claim 11, wherein the instructions are configured to cause the processor to, upon establishing the communication link, sending an announcement message indicating that the IED is capable of communicating event information.

13. The non-transitory, computer-readable medium of claim 11, wherein the server is a key server, and wherein the instructions are configured to be executed by a processor to cause operations comprising sending the MKA message to the key server to allow the key server to relay the event information to a log server.

14. The non-transitory, computer-readable medium of claim 11, wherein the event information comprises logging information, alerting information, or both.

15. The non-transitory, computer-readable medium of claim 11, wherein the IED is configured to continue to send event information whenever a new device log is generated.

* * * * *